(12) United States Patent
Heinzl (10) Patent No.: US 9,677,791 B2
(45) Date of Patent: Jun. 13, 2017

(54) ABSORPTION REFRIGERATION MACHINE

(75) Inventor: Wolfgang Heinzl, Ramerberg (DE)

(73) Assignee: Major Bravo Limited, Tortola (VG)

( * ) Notice: Subject to any disclaimer, the term of this patent is extended or adjusted under 35 U.S.C. 154(b) by 736 days.

(21) Appl. No.: 14/238,358

(22) PCT Filed: Aug. 8, 2012

(86) PCT No.: PCT/EP2012/065519
§ 371 (c)(1),
(2), (4) Date: May 27, 2014

(87) PCT Pub. No.: WO2013/021005
PCT Pub. Date: Feb. 14, 2013

(65) Prior Publication Data
US 2014/0290306 A1    Oct. 2, 2014

(30) Foreign Application Priority Data
Aug. 11, 2011   (DE) .................. 10 2011 110 018

(51) Int. Cl.
| | | |
|---|---|---|
| F25B 15/00 | (2006.01) | |
| F25B 15/06 | (2006.01) | |
| F25B 15/14 | (2006.01) | |

(52) U.S. Cl.
CPC .............. F25B 15/00 (2013.01); F25B 15/06 (2013.01); F25B 15/14 (2013.01); *Y02B 30/62* (2013.01)

(58) Field of Classification Search
CPC .......... F25B 15/00; F25B 15/06; F25B 15/14; Y02B 30/62; Y02B 30/64
See application file for complete search history.

(56) References Cited

U.S. PATENT DOCUMENTS 2,802,344 A * 8/1957 Witherell ............. B01D 61/422
                                                          204/523
4,062,197 A * 12/1977 Hester .................. B01D 61/025
                                                          62/101
(Continued)

FOREIGN PATENT DOCUMENTS

| CN | 101647316 | 2/2010 |
|---|---|---|
| EP | 2 123 997 | 11/2009 |

(Continued)

OTHER PUBLICATIONS

International Search Report for International Application PCT/EP2012/065519 (Jun. 19, 2013).

*Primary Examiner* — Allana Lewin Bidder
*Assistant Examiner* — Antonio R Febles
(74) *Attorney, Agent, or Firm* — Mintz Levin Cohn Ferris Glovsky and Popeo, P.C.; Peter F. Corless; Steven M. Jensen (57) ABSTRACT

The invention relates to an absorption refrigeration machine (10) that includes an evaporator (12) and an absorber (18) and is characterized in that the evaporator (12) comprises at least one evaporating unit (12') having a coolant channel (26), through which the coolant (16) flows and which is delimited at least in part by a heat-conducting, vapor- and liquid-tight wall (24), and having at least one refrigerant channel (28) that adjoins the heat-conducting wall (24), is loaded with the refrigerant (14), and is separated from a vapor chamber (32) by a vapor-permeable, liquid-tight membrane wall (30) on the side of the refrigerant channel opposite the heat-conducting wall (24), and in that the absorber (18) comprises an absorption unit (18') having a cooling-medium channel, through which a cooling medium (34) flows and which is delimited at least in part by a heat-conducting, vapor- and liquid-tight wall (36), and having an absorption channel (40) which adjoins the heat- (Continued)

conducting wall and to which the concentrated, low-refrigerant pair of working substances (22) is fed and which is loaded with refrigerant vapor (20) from the vapor chamber (32) via a vapor-permeable, liquid-tight membrane wall (42) provided on the side of the absorption channel opposite the heat-conducting wall (36).

16 Claims, 5 Drawing Sheets

(56) References Cited

U.S. PATENT DOCUMENTS

| | | | | |
|---|---|---|---|---|
| 6,935,417 | B1* | 8/2005 | Inoue | F25B 15/02 |
| | | | | 165/110 |
| 2006/0150665 | A1* | 7/2006 | Weimer | F25B 15/14 |
| | | | | 62/476 |
| 2011/0126563 | A1 | 6/2011 | Tang et al. | |
| 2013/0133346 | A1* | 5/2013 | Garimella | F25B 15/02 |
| | | | | 62/101 |
| 2013/0340449 | A1* | 12/2013 | Kozubal | F25B 15/00 |
| | | | | 62/92 |

FOREIGN PATENT DOCUMENTS

| | | |
|---|---|---|
| JP | 2001-041608 A | 2/2001 |
| JP | 2002-081783 A | 3/2002 |
| JP | 5489143 B2 | 5/2014 |
| WO | 2007/144024 | 12/2007 |
| WO | 2012/114456 A1 | 8/2012 |

* cited by examiner

ABSORPTION REFRIGERATION MACHINE

CROSS-REFERENCE TO RELATED APPLICATIONS

This application is a National Phase application filed under 35 USC 371 of PCT International Application No, PCT/EP2012/065519 (WO 2013/021005) with an international Filing Date of Aug. 8, 2012, which claims under 35 U.S.C. §119(a) the benefit of German Application No, 10 2011 110 018.4, filed Aug. 11, 2011, the entire contents of which are incorporated herein by reference.

The invention relates to an absorption refrigeration machine having an evaporator for evaporating a refrigerant while absorbing heat from a refrigerant agent circuit and having an absorber for absorbing the refrigerant vapor by the concentrated, low-refrigerant working substance pair.

In such an absorption refrigeration machine, the working substance pair as a rule comprises a saline solution as well as the refrigerant, with in particular LiBr and water having proved themselves. LiBr solutions are, however, in particular highly corrosive in the presence of oxygen. Consequently, absorption refrigeration machines of the initially named kind have previously only been operated as closed plant, wherein in the normal case the evaporator and the absorber are accommodated in a first housing in a vacuum at a pressure stage p1 and a desorber for the desorption of the refrigerant from the high-refrigerant working substance pair and a condenser for condensing the refrigerant with subsequent expansion are accommodated in a further housing in a vacuum at a pressure stage p2. The vacuum, which is usually below 100 mbar, admittedly brings about a low oxygen partial pressure. High-alloyed stainless steels nevertheless have to be used in practice to avoid corrosion. In addition, there is the fact that to date the saline solution is trickled in via pipes and comes into contact with all component, in particular housings and pipes.

Previously, predominantly horizontal bundled tube apparatus have been used over which the working medium, water or the saline solution, is distributed via perforated bottoms. The water and the saline solutions have to wet the pipes completely to ensure a good transfer of heat and substance. To achieve such a uniform wetting of the pipes, it is necessary always to work with mass flows which are larger than the minimum quantities required for the ideal exchange of heat and substance.

Document US 2011/0126563 A1 discloses an absorption refrigeration machine having the features of the preamble of claim 1. Further conventional absorption refrigeration machines are known from documents WO 2007/144024 A1 and EP 2 123 997 A1.

It is the substantially the underlying object of the invention to provide an improved absorption refrigeration machine of the initially named kind with which the previously mentioned disadvantages have been eliminated. In addition, a so-called open absorption refrigeration machine should also be able to be realized in which concentrated saline solution is supplied to the process from the outside by the system boundary and diluted saline solution is guided to the outside via the system boundary, that is the absorption refrigeration machine only has to the comprise the evaporator and the absorber and not also a desorber and a condenser.

This object is satisfied in accordance with the invention in that the evaporator comprises a plurality of evaporation units each having a refrigerant agent channel flowed through by the refrigerant agent and bounded at least in part by a heat-conductive, vapor-tight and liquid-tight wall and having at least one refrigerant agent channel which is adjacent to the heat-conductive wall, which is acted on by the refrigerant and which is separated from a vapor space at its side disposed opposite the heat-conductive wall by a vapor-permeable, liquid-tight membrane wall; and in that the absorber comprises a plurality of absorption units each having a coolant channel flowed through by a coolant and bounded at least in part by a heat-conductive, vapor-tight and liquid-tight wall and having at least one absorption channel which is adjacent to the heat-conductive wall, to which the concentrated, low-refrigerant working substance pair is supplied and which is acted on by refrigerant vapor from the vapor space via a vapor-permeable, liquid-tight membrane wall provided at its side disposed opposite the heat-conductive wall.

Due to this design, the absorption refrigeration machine can be designed at least partly as a modular flow system having a plurality of frame elements, with the different functional units such as in particular a respective refrigerant agent channel, a respective refrigerant channel, a respective coolant channel and a respective absorption channel each being able to be provided in the form of such a frame element. The frame elements can be provided with web structures via which they can be connected to one another in particular for forming a respecting evaporation unit and a respective absorption unit. The frame elements can each comprise an inner region which is surrounded by an outer frame and which can preferably be provided with a spacer, in particular a grid-like spacer, which can in particular be provided at at least one side with a respective functional surface for forming a respective channel, said functional surface advantageously respectively being formed by a film or by a membrane.

The absorption refrigeration machine can therefore in particular be at least partly made up of frame elements which can comprise applied functional surfaces in the form of a film or membrane. For example the following types of frame elements are conceivable: a frame element provided at both sides with a heat-conductive film; a frame element provided at one side with a vapor-permeable, liquid-tight membrane wall; a frame element having a heat-conductive film on the one side and a vapor-permeable, liquid-tight membrane wall on a further side, in particular an oppositely disposed side, etc. In particular a respective evaporation unit and a respective absorption unit can advantageously be made up of such frame elements.

The different channels, including the heat-conductive, vapor-tight and liquid-tight walls or the vapor-permeable and liquid-tight membrane walls bounding them, preferably comprise plastic.

Since the saline solution, the refrigerant agent, the refrigerant, the coolant, etc. are always conducted in closed channels, a spraying or wetting of the respective housing no longer occurs. It is additionally ensured by the conducting of the working substance pair comprising the refrigerant and the saline solution in closed channels that the exchange surfaces are completely wetted with ideal mass flows.

Since the different channels, including the heat-conductive, vapor-tight and liquid-tight walls or the vapor-permeable, liquid-tight membrane walls bounding them, can exclusively comprise plastic, a so-called open absorption refrigeration machine can also be realized without problem which can only comprise the evaporator and the absorber and does not also have to comprise a desorber and a condenser. With such an open absorption refrigeration machine, concentrated saline solution, in particular LiBr solution, can be supplied to the process from the outside via the system boundary and diluted saline solution or LiBr solution can be conducted to the outside via the system boundaries. Corrosion can practically no longer take place due to the exclusive use of plastics.

Oxygen which is dissolved in the concentrated saline solution in accordance with its partial pressure can be allowed on the use of plastics. This would result in the corrosion and destruction of the plant on the previously customary use of steel.

A respective open absorption refrigeration machine can therefore only comprise the evaporator and the absorber without a desorber or a condenser, with the evaporator and the absorber being able to be accommodated in a common housing. In the center for the refrigerant agent generation, in particular for the cold water generation, only the refrigerant agent and the concentrated saline solution, in particular concentrated LiBr, are therefore required. The regeneration of the diluted saline solution can take place at a different location at which, for example, waste heat is present. A storage operation comprising a tank with concentrated saline solution is, for example, also possible with such open systems.

In accordance with the invention, a respective evaporation unit and a respective absorption unit are alternately provided for forming an integrated evaporator/absorber unit in a consecutive arrangement of a plurality of evaporation and absorption units, wherein a respective pair of directly consecutive evaporation and absorption units and/or absorption units and evaporation units preferably have mutually facing, vapor-permeable, liquid-tight membrane walls.

The evaporation units arranged between two absorption each have at at least two mutually opposite sides of the refrigerant agent channel a refrigerant channel which is separated from the refrigerant agent channel by a heat-conductive, vapor-tight and liquid-tight wall and which is separated from the vapor space at its side disposed opposite the heat-conductive wall by a vapor-permeable, liquid-tight membrane wall.

It is in particular also of advantage when at least one absorption unit is provided which respectively has at at least two mutually opposite sides of the coolant channel an absorption channel which is separated from the coolant channel by a heat-conductive, vapor-tight and liquid-tight wall and which is acted on by vapor from the vapor space via a vapor-permeable, liquid-tight membrane wall provided at its side disposed opposite the heat-conductive wall.

The pressure in the vapor space is expediently lowered so far that vapor is produced by cooling the refrigerant agent at the heat-conductive, vapor-tight and liquid-tight wall in the refrigerant channel of a respective evaporation unit and this vapor enters through the vapor-permeable, liquid-tight membrane wall into the vapor space via which the absorption channel of a respective absorption unit is acted on by vapor.

The evaporator and the absorber can, as already mentioned, be accommodated in a common housing comprising the vapor space.

As stated, the absorption refrigeration machine can in particular also be designed as a so-called open absorption refrigeration machine without a desorber and without a condenser. In accordance with an alternative expedient embodiment, the absorption refrigeration machine can, however, also comprise a desorber for the desorption of the refrigerant from the high-refrigerant working substance pair and a condenser for the condensation of the refrigerant by means of a subsequent expansion.

During the absorption, the refrigerant vapor formed in the evaporator can be absorbed by the concentrated, low-refrigerant working substance pair coming from the desorber. The solution heat becoming free in this process is as a rule led off to the outside to maintain the absorption process. Some of the refrigerant is expelled from the high-refrigerant working substance pair in the desorber or expeller.

A heat transfer for the cooling of the hot, low-refrigerant working pair coming from the desorber can take place in a solution heat exchanger. The low-refrigerant solution coming from the desorber can be cooled in the solution heat exchanger, with the high-refrigerant solution entering into the desorber being able to simultaneously be preheated. The energy requirement for the desorption of the refrigerant in the desorber is reduced by such a solution heat exchanger.

In accordance with a preferred practical embodiment of the absorption refrigeration machine in accordance with the invention, the desorber comprises at least one desorption unit having a heating agent channel flowed through by a heating agent and bounded at least in part by a heat-conductive, vapor-tight and liquid-tight wall and having at least one desorption channel which adjoins the heat-conductive wall, which is acted on by the high-refrigerant working substance pair and which is separated from a further vapor space at its side disposed opposite the heat-conductive wall by a vapor-permeable, liquid-tight membrane wall, whereas the condenser comprises at least one condensation unit having a coolant channel flowed through by the coolant and bounded at least in part by a heat-conductive, vapor-tight and liquid-tight wall and having at least one condensation channel which is adjacent to the heat-conductive wall and which is acted on by vapor from the further vapor space via a vapor-permeable, liquid-tight membrane wall provided at its side disposed opposite the heat-conductive wall.

The desorber preferably comprises a plurality of desorption units.

It is also if advantage if the condenser comprises a plurality of condensation units.

At least one desorption unit is expediently provided which respectively has at at least two mutually opposite sides of the heating agent channel a desorption channel which is separated from the heating agent channel by a heat-conductive, vapor-tight and liquid-tight wall and which is separated from the further vapor space at its side disposed opposite the heat-conductive wall by a vapor-permeable, liquid-tight membrane wall.

It is in particular also of advantage when at least one condensation unit is provided which respectively has at at least two mutually opposite sides of the coolant channel a condensation channel which is separated from the coolant channel by a heat-conductive, vapor-tight and liquid-tight wall and which is acted on by vapor from the further vapor space via a vapor-permeable, liquid-tight membrane wall provided at its side disposed opposite the heat-conductive wall.

There is preferably a vacuum both in the first vapor space and in the further vapor space, with the pressure in the further vapor space preferably being larger than in the first vapor space.

The evaporator and the absorber, on the one hand, and the desorber and the condenser, on the other hand, are preferably accommodated in two separate houses comprising the first vapor space and the further vapor space respectively.

In accordance with an expedient embodiment, a respective desorption unit and a respective condensation unit are alternately provided for forming an integrated desorber/condenser unit in a consecutive arrangement of a plurality of desorption and condensation units, with a respective pair of directly consecutive desorption and condensation units or condensation and desorption units preferably having mutually facing vapor-permeable, liquid-tight membrane walls.

A common coolant circuit can be provided for the absorber and the condenser.

The different channels of the desorber and of the condenser, including the heat-conductive, vapor-tight and liquid-tight walls or vapor-permeable, liquid-tight membrane walls bounding them, can again comprise plastic. The desorption and condensation units can in the same way as the evaporation and absorption units advantageously again be formed by respective frame elements of the previously named kind comprising at least one film and/or at least one membrane, with at least these frame elements preferably exclusively comprising plastic.

The invention will be explained in more detail in the following with reference to embodiments and to the drawing; there are shown in this.

Figure 1:
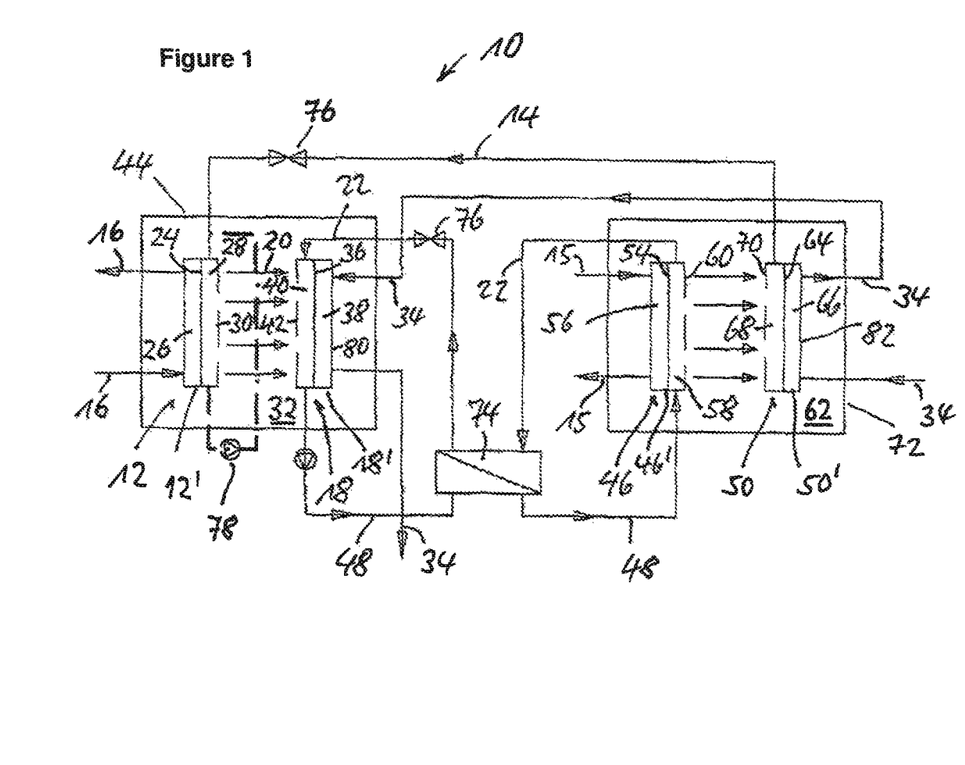
FIG. 1 a schematic representation of an exemplary embodiment of an absorption refrigeration machine comprising an evaporator, an absorber, a desorber and a condenser.

FIG. 1 shows in a schematic representation an exemplary embodiment of an absorption refrigeration machine 10 having an evaporator 12 for evaporating a refrigerant 14 while absorbing heat from a refrigerant agent circuit 16 and having an absorber 18 for absorbing the refrigerant vapor 20 through the concentrated, low-refrigerant working substance pair 22.

The evaporator 12 comprises at least one evaporation unit 12' having a refrigerant agent channel 26 flowed through by the refrigerant agent 16 and bounded at least in part by a heat-conductive, vapor-tight and liquid-tight wall 24 and having a refrigerant channel 28 which is adjacent to the heat-conductive wall 24, which is acted on the refrigerant 14 and which is separated from a vapor space 32 at its side disposed opposite the heat-conductive wall 24 by a vapor-permeable, liquid-tight membrane wall 30.

The absorber 18 comprises at least one absorption unit 18' having a coolant channel 38 flowed through by a coolant 34 and bounded at least in part by a heat-conductive, vapor-tight and liquid-tight wall 36 and having at least one absorption channel 40 which is adjacent to the heat-conductive wall 36, to which the concentrated, low-refrigerant working substance pair 22 is supplied and which is acted on by refrigerant vapor 20 from the vapor space 32 via a vapor-permeable, liquid-tight membrane wall 43 provided at its side disposed opposite the heat-conductive wall 36.

The evaporator 12 and the absorber 18 are accommodated in a common housing 44 comprising the vapor space 32.

In the present case, the absorption refrigeration machine 10 further comprises a desorber 46 for the desorption of the refrigerant from the high-refrigerant working substance pair 48 and a condenser 50 for the condensation of the refrigerant 14 with subsequent expansion.

The desorber 46 comprises at least one desorption unit 46' having a heating agent channel 56 flowed through by a heating agent 15 and bounded at least in part by a heat-conductive, vapor-tight and liquid-tight wall 54 and having at least one desorption channel 58 which is adjacent to the heat-conductive wall 54, which is acted on by the high-refrigerant working substance pair 48 and which is separated from a further vapor space 62 at its side disposed opposite the heat-conductive membrane wall 54 by a vapor-permeable, liquid-tight membrane wall 60.

The condenser 50 comprises at least one condensation unit 50' having a coolant channel 66 flowed through by a coolant 34 and bounded at least in part by a heat-conductive, vapor-tight and liquid-tight wall 64 and having at least one condensation channel 68 which is adjacent to the heat-conductive wall 64 and which is acted on by vapor from the further vapor space 62 at its side disposed opposite the heat-conductive wall 66 via a vapor-permeable, liquid-tight membrane wall 70 provided.

A respective vacuum is present both in the first vapor space 32 and in the further vapor space 62, with the pressure in the further vapor space 62 preferably being higher than in the first vapor space 32.

The evaporator 12 and the absorber 18, on the one hand, and the desorber 46 and the condenser 50, on the other hand, are accommodated in two separate housings 44, 72 comprising the first and the further vapor spaces 32, 62 respectively.

In the present case, a common coolant circuit 34 is provided for the absorber 18 and for the condenser 50.

A heat transfer for the cooling of the hot, concentrated, low-refrigerant working substance pair coming from the desorber 46 can take place in a solution heat exchanger 74. The concentrated, low-refrigerant working substance pair 22 coming from the desorber 46 is cooled in the solution heat exchanger 74. At the same time, the high-refrigerant working substance pair 48 entering into the desorber 46 is preheated. The energy requirement for the desorption of the refrigerant in the desorber 46 is reduced by the solution heat exchanger 74.

As can be recognized with reference to FIG. 1, a respective restrictor 76 can be provided between the condensation channel 68 of the condenser 50 and the refrigerant channel 28 of the evaporator 12 as well as between the solution heat exchanger 74 and the absorption channel 40 of the absorber 18.

The working substance pair can in particular comprise water as the refrigerant and an LiBr solution as the saline solution. The refrigerant agent 16 can in particular be cold water.

The heating agent 15 can in particular be hot water. In particular cooling water can be provided as the coolant 34.

The refrigerant agent 16 or the cold water is the product.

The evaporator 12, the absorber 18, the desorber 46 and the condenser 50 can each be designed using frame elements each having at least one heat-conductive film and/or at least one membrane. Since preferably only plastics are used, a small oxygen content in the system is completely harmless.

The absorption refrigeration machine 10 can therefore in particular comprises an evaporator 12, an absorber 18, a desorber 46 and a condenser 50. The evaporator 12 comprises a refrigerant agent channel 26 in which the refrigerant agent 16 to be cooled flows and a refrigerant channel 28 which is adjacent to the refrigerant agent 16 at the one side via a heat-conductive, liquid-tight wall 24 and which is separated from the first vapor space 32 at the side disposed opposite the heat-conductive wall 24 via a vapor-permeable, liquid-tight membrane wall 30. The pressure in the first housing 32 is lowered so far that vapor is produced at the heat-conductive wall 24 in the refrigerant channel 28 by the cooling of the refrigerant agent 16 and this vapor then enters through the vapor-permeable, liquid-tight membrane 30 into the first vapor space 32 which contains opposite the first membrane wall 30 a second membrane wall 42 associated with the absorber 18. The refrigerant 14, for example water, can flow in excess through the refrigerant channel 28 of the evaporator 12, that is more water can flow through the refrigerant channel 28 than is evaporated. In this case, a pump 78 can be provided for returning the excess water into the evaporator 12.

The absorber 18 can comprise an absorption channel 40 which is acted on by the concentrated, low-refrigerant working substance pair 22 and which is bounded toward the first vapor space 32 by the vapor-permeable, liquid-tight membrane wall 42 and opposite the membrane wall 42 by a heat-conductive, vapor-tight and liquid-tight wall 36 which is adjoined by a coolant channel 38 for the coolant 34 and which is ended by a further wall 80 toward the interior of the first housing 44.

Further main components of the absorption refrigeration machine 10, namely the desorber 46 and the condenser 50, are located in the second housing 72. There is a vacuum in both housings 44, 72, with the pressure in the second housing 72 being larger than that in the first housing 44.

The desorber 46 can be made up of two channels, with the heating agent 15 flowing in a heating agent channel 56 and this heating agent channel 56 being bounded toward a desorption channel 58 by a heat-conductive, vapor-tight and liquid-tight wall 64. The desorption channel 58 adjoining this heat-conductive, vapor-tight and liquid-tight wall 54 at the other side is ended toward the further vapor space 62 by a vapor-permeable, liquid-tight membrane 60 disposed opposite the heat-conductive wall 54.

The condenser 50 which likewise again comprises two channels 66, 68 is provided above and neighboring the second vapor space 62. The condensation channel 68 for the condensing vapor thus adjoins the vapor-permeable, liquid-tight membrane wall 70 of the condenser 50 adjacent to the second vapor space 62. This condensation channel 68 is bounded at the side disposed opposite the membrane wall 70 by a heat-conductive, vapor-tight and liquid-tight wall 64. The coolant channel 66, which is ended by a further wall 82 toward the interior of the second housing 72, directly adjoins this heat-conductive wall 64.

The solution heat exchanger 74 in the saline solution line cools the hot, concentrated low-refrigerant working substance pair 22 from the desorber 46 with respect to the cold, high-refrigerant working substance pair 48 from the absorber 18. The pressure differences in the absorption refrigeration machine are compensated via pumps and restrictors in the manner generally familiar to the skilled person. The absorption refrigeration machine can in particular be supplied with cold water and hot water. Instead of water, however, another medium can also take over the functions of heating and cooling.

In the embodiment in accordance with FIG. 1, the evaporator 12, the absorber 18, the desorber 46 and the condenser 50 each comprise only one evaporation unit 12, absorption unit 18', desorption unit 46' and condensation unit 50' respectively.

Figure 2:
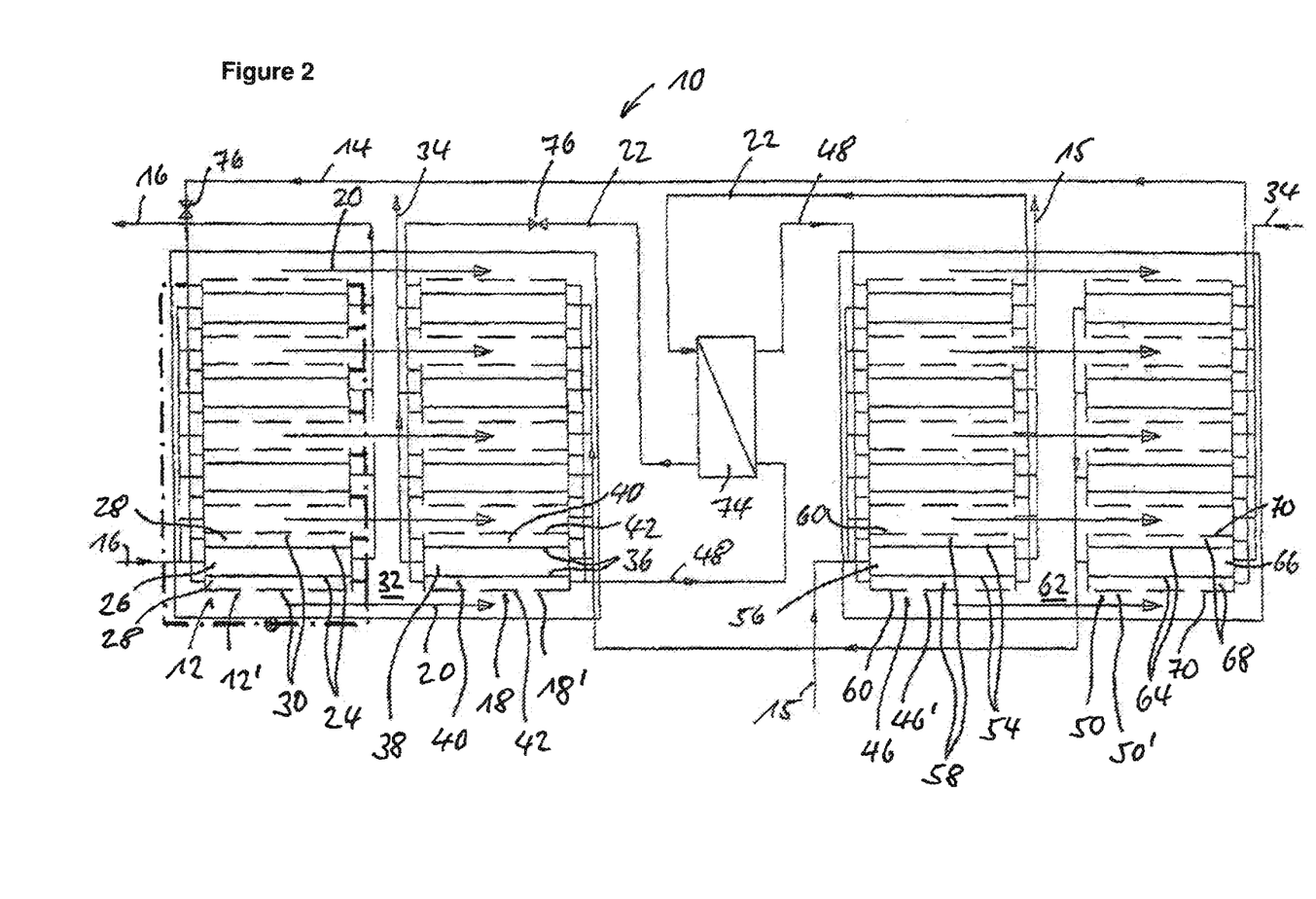
FIG. 2 a schematic plan view of a further exemplary embodiment of an absorption refrigeration machine which essentially differs from that of FIG. 1 in that the evaporator, the absorber, the desorber and the condenser each comprise a plurality of evaporation units, absorption units, desorption units and condensation units respectively.

FIG. 2 shows in a schematic plan view a further exemplary embodiment of an absorption refrigeration machine 10 which differs from that of FIG. 1 substantially in that the evaporator 12, the absorber 18, the desorber 46 and the condenser 50 each comprise a plurality of evaporation unit 12', a plurality of absorption units 18', a plurality of desorption units 46' and a plurality of condensation units 50' respectively.

In addition, the evaporation units 12' in the present case have at at least two mutually opposite sides of the refrigerant agent channel 26 a respective refrigerant channel 28 which is separated from the refrigerant agent channel by a heat-conductive, vapor-tight and liquid-tight wall 24 and which is separated from the first vapor space 32 at its side disposed opposite the heat-conductive wall 24 by a vapor-permeable, liquid-tight membrane wall 30.

As can be seen from FIG. 2, at least one absorption unit 18' can also be provided which has at at least two mutually opposite sides of the coolant channel 38 a respective absorption channel 40 which is separated from the coolant channel by a heat-conductive, vapor-tight and liquid-tight wall 36 and which is acted on by vapor from the first vapor space 32 via a vapor-permeable, liquid-tight membrane wall 42 provided at its side disposed opposite the heat-conductive wall 36.

Moreover, at least one desorption unit 46' can also be provided which respectively has at at least two mutually opposite sides of the heating agent channel 56 a desorption channel 58 which is separated from the heating agent channel by a heat-conductive, vapor-tight and liquid-tight wall 54 and which is separated from the further vapor space 62 at its side disposed opposite the heat-conductive wall 54 by a vapor-permeable, liquid-tight membrane wall 60.

Finally, at least one condensation unit 50' can also be provided which has at at least two mutually opposite sides of the coolant channel 66 a respective condensation channel 68 which is separated from the coolant channel by a heat-conductive, vapor-tight and liquid-tight wall 64 and which is acted on by vapor from the further vapor space 62 via a vapor-permeable, liquid-tight membrane wall 70 provided at its side disposed opposite the heat-conductive wall 64.

In the present embodiment shown in FIG. 2, the different units 12', 18', 46' and 50' of the evaporator 12, of the absorber 18, of the desorber 46 and of the condenser 50 are each arranged horizontally next to one another, for example.

In the present embodiment, the channels are therefore multiplied to be able to achieve larger surface which can be freely scaled and accompanying this to be able to achieve larger refrigeration performances. In another respect, the absorption refrigeration machine shown in FIG. 2 has at least substantially the same design as that of FIG. 1, with the same reference numerals being associated with mutually corresponding parts.

Figure 3:
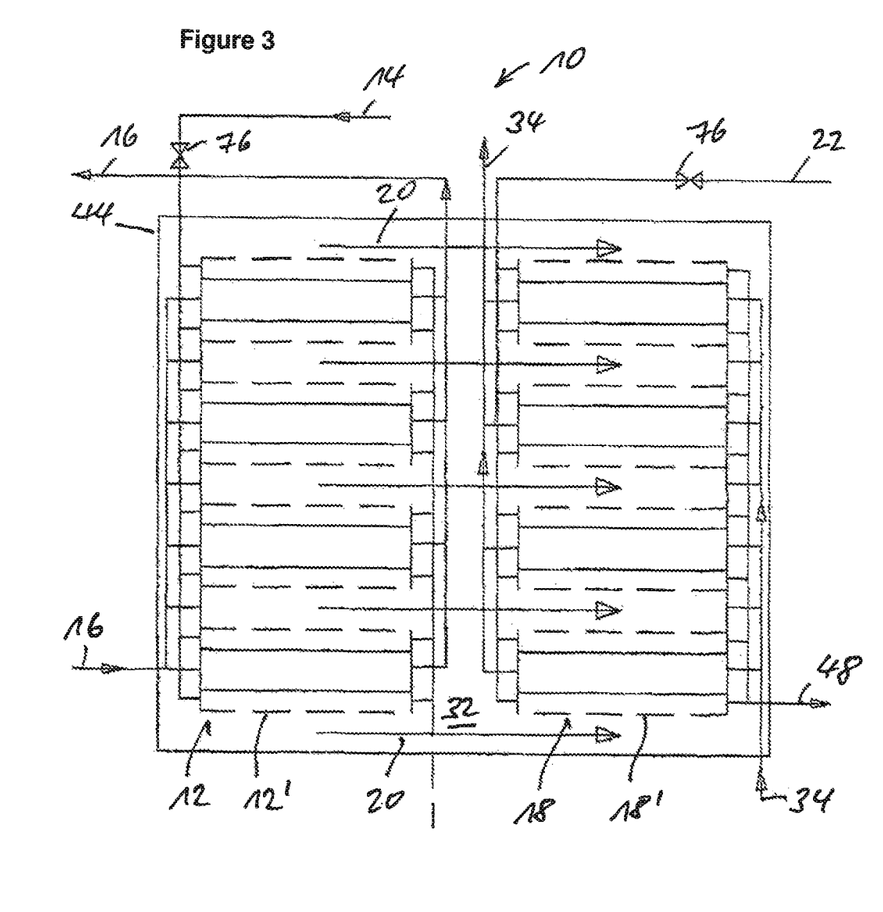
FIG. 3 a schematic plan view of an exemplary embodiment of a so-called open absorption refrigeration machine without a desorber and without a condenser.

FIG. 3 shows in a schematic plan view an exemplary embodiment of a so-called open absorption refrigeration machine 10 without a desorber and without a condenser. In this respect, the absorption refrigeration machine 10 only comprises one housing 44 which contains an evaporator 12 and an absorber 18. There is a vacuum in the housing 44. The working substance pair comprising the refrigerant 14, for example water, and the saline solution, for example the LiBr solution, is supplied to this open absorption refrigeration machine 10. Diluted saline solution which can be output to the outside for reprocessing is produced from the working substance pair. The absorption refrigeration machine is again connected to a cooling side for operation.

In the present case, the evaporator 12 and the absorber 18 again have at least substantially the same design as the evaporator 12 and as the absorber 18 in accordance with FIG. 2, with the same reference numerals being associated with mutually corresponding parts.

Figure 4:
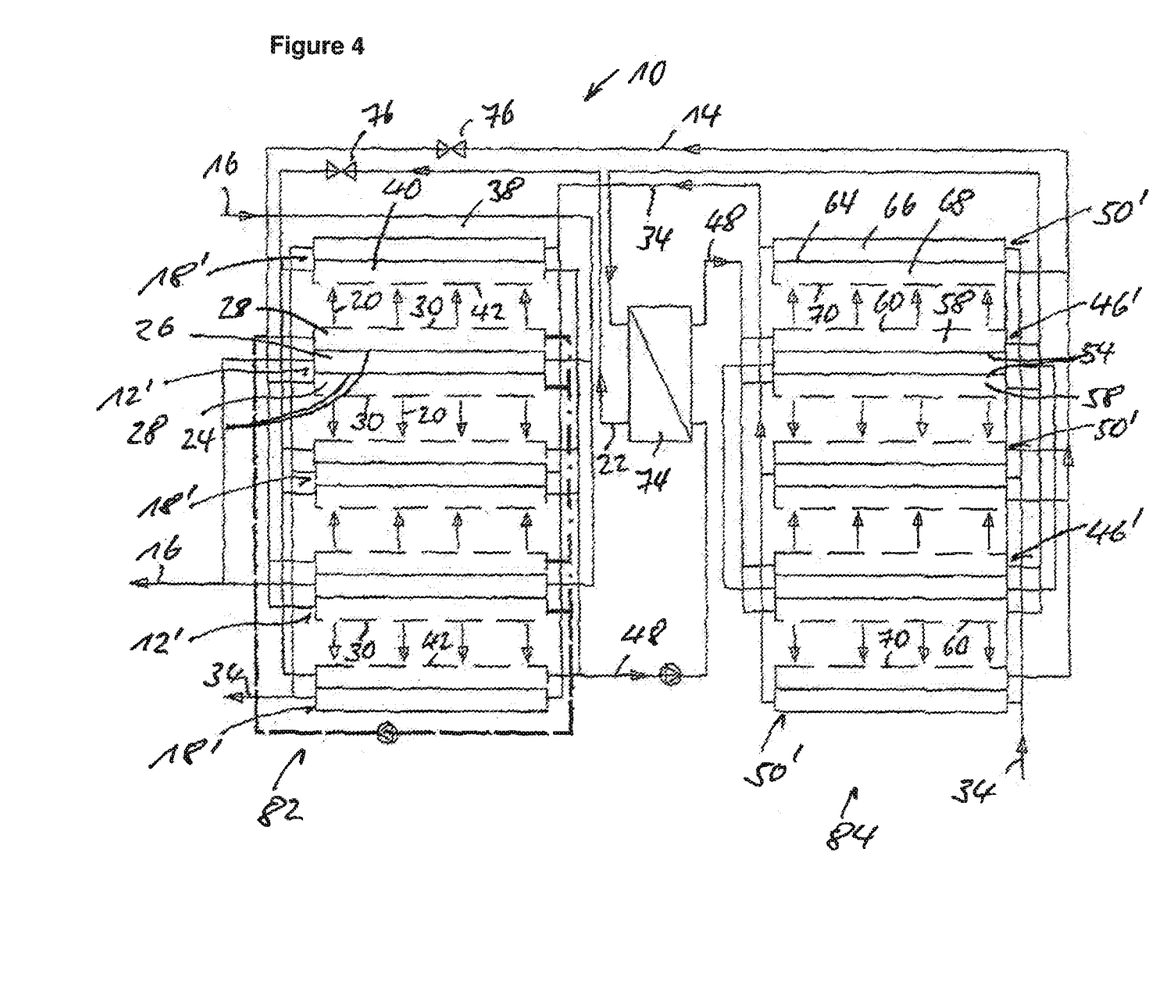
FIG. 4 a schematic plan view of an exemplary embodiment of an absorption refrigeration machine with an integrated evaporator/absorption unit and an integrated desorber/condenser unit.

FIG. 4 shows in a schematic plan view an exemplary embodiment of an absorption refrigeration machine 10 having an integrated evaporator/absorption unit 82 and an integrated desorber/condenser unit 84.

In this respect, a respective evaporation unit 12' and a respective absorption unit 18' are alternately provided for forming the integrated evaporator/absorber unit 82 in a consecutive arrangement of a plurality of evaporation units and absorption units, with a respective pair of directly consecutive evaporation units and absorption units or absorption units and evaporation units having mutually facing, vapor-permeable, liquid-tight membrane walls 30, 42. In the present case, the evaporation and absorption units 12, 12' are, for example, arranged horizontally next to one another, with at the two ends a respective absorption unit 18' having a coolant channel 38 and an absorption channel 40 and between them at least one evaporation unit 12' and at least one absorption unit 18' being able to be provided. The units 12', 18' provided between the two end-side absorption units 18' can again each have three channels as is the case with the corresponding units 12', 18' in accordance with FIG. 2.

A respective desorption unit 46' and a respective condensation unit 50' can be alternately provided in a consecutive arrangement of a plurality of desorption units and condensation units for forming an integrated desorber/condenser unit 84, with a respective pair of directly following desorption units and condensation units or condensation unit and desorption units having mutually facing vapor-permeable, liquid-tight membrane walls 60, 70.

In the present case, the desorption and condensation units 46', 50' of the integrated desorber/condenser unit 84 are, for example, arranged horizontally next to one another, with at the two ends, for example, a respective condensation unit 50 being arranged and therebetween at least one desorption unit 46' and/or at least one condensation unit 50'. As can be recognized with reference to FIG. 4, the units 46', 50' arranged between the end-side condensation units 50 can each again comprise three channels such as is the case in the desorption and condensation units 46', 50' in accordance with FIG. 2.

The high integration of this embodiment in accordance with FIG. 4 is in particular made possible in that all liquid flows are guided in channels which are bounded by vapor-permeable, liquid-tight membranes and heat-exchanging walls. The integrated evaporator/absorber unit 82 and the integrated desorber/condenser unit 84 can each be realized by a corresponding sequence of frame elements with vapor-permeable, liquid-tight membranes and heat-exchanging walls or films. Channels are thus produced for the refrigerant agent or the cold water, for the concentrated and diluted saline solution and for the vapor. The integrated evaporation/absorber unit 82 and the integrated desorber/condenser unit 84 are again located in separate housings (not shown).

The functional surfaces and functional channels for the evaporation and for the condensation are preferably disposed directly opposite one another in the evaporator/absorber unit and in the desorber/condenser unit 84.

In this respect, a respective refrigerant channel 28 of a respective evaporation unit 12' is arranged in the integrated evaporator/absorber unit 82 with its side having the membrane wall 30 being arranged disposed opposite a side of an absorption channel 40 of a respective absorption unit 18' having the membrane wall 42.

A respective desorption channel 58 of a respective desorption unit 46' is arranged in the integrated desorber/condenser unit 84 with its side having the membrane wall 60 being arranged disposed opposite a side of a condensation channel 68 of a respective condensation unit 50' having the membrane wall 70.

In another respect, the absorption refrigeration machine 10 in accordance with FIG. 4 can again at least substantially have the same design as that in accordance with FIG. 2, with the same reference numerals being associated with mutually corresponding parts.

Figure 5:
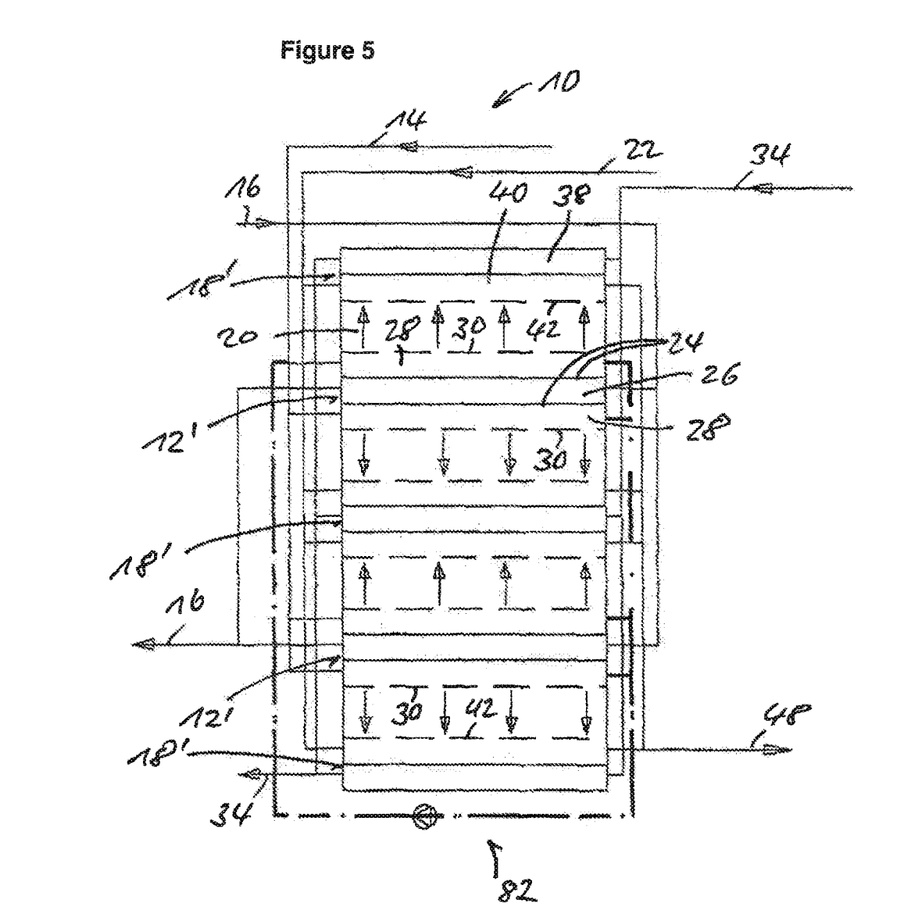
FIG. 5 a schematic plan view of an exemplary embodiment of a so-called open absorption refrigeration machine without a desorber and without a condenser and with an integrated evaporator/absorber unit in accordance with FIG. 4.

FIG. 5 shows in a schematic plan view an exemplary embodiment of a so-called open absorption refrigeration machine 10 without a desorber and without a condenser with an integrated evaporator/absorber unit 82. In this respect, the integrated evaporator/absorber unit 82 has at least substantially the same design as that of the absorption refrigeration machine 10 in accordance with FIG. 4. The same reference numerals are associated with mutually corresponding parts.

The pressure in the vapor space 32 is preferably lowered in each case in the different embodiments so far that vapor is produced by cooling the refrigerant agent 16 at the heat-conductive, vapor-tight and liquid-tight wall 24 in the refrigerant channel 26 of a respective evaporation unit 12' and this vapor enters through the vapor-permeable, liquid-tight membrane wall 30 into the vapor space 32 via which the absorption channel 40 of a respective absorption unit 18' has vapor applied to it.

The different channels, including the heat-conductive, vapor-tight and liquid-tight walls or the vapor-permeable and liquid-tight membrane walls bounding them, preferably exclusively comprise plastic. In this respect, the evaporation units, desorption units and condensation units 12', 18, 46', 15' or the integrated evaporator/absorber units and desorber/condenser units 82, 84 can in particular be made up of the already mentioned frame elements each having at least one heat-conductive film and/or at least one membrane.

REFERENCE NUMERAL LIST 10 absorption refrigeration machine
12 evaporator
12' evaporation unit
14 refrigerant
15 heating agent
16 refrigerant agent, refrigerant agent circuit
18 absorber
18' absorption unit
20 refrigerant vapor
22 concentrated, low-refrigerant working substance pair
24 heat-conductive, liquid-tight wall
26 refrigerant agent channel
28 refrigerant channel
30 vapor-permeable, liquid-tight membrane wall
32 vapor space
34 coolant, coolant circuit
36 heat-conductive, vapor-tight and liquid-tight wall
38 coolant channel
40 absorption channel
42 vapor-permeable, liquid-tight membrane wall
44 housing
46 desorber
46' desorption unit 48 high-refrigerant working substance pair
50 condenser
50' condensation unit
52 heating agent
54 heat-conductive, vapor-tight and liquid-tight wall
56 heating agent channel
58 desorption channel
60 vapor-permeable, liquid-tight membrane wall
62 further vapor space
64 heat-conductive, vapor-tight and liquid-tight wall
66 coolant channel
68 condensation channel
70 vapor-permeable, liquid-tight membrane wall
72 housing
74 solution heat-exchanger
76 restrictor
78 pump
80 wall
82 integrated evaporator/absorber unit
84 integrated desorber/condenser unit

The invention claimed is:

1. An absorption refrigeration machine having an evaporator for evaporating a refrigerant to produce a refrigerant vapor while absorbing heat from a refrigerant agent circuit circulating a refrigerant agent and having an absorber for absorbing the refrigerant vapor through a concentrated, low-refrigerant working substance pair, wherein the evaporator comprises a plurality of evaporation units each having a refrigerant agent channel flowed through by the refrigerant agent and bounded at least in part by a heat-conductive, vapor-tight and liquid-tight wall and having at least one refrigerant channel which is adjacent to the heat-conductive wall, which is acted on by the refrigerant and which is separated from a vapor space at its side disposed opposite the heat-conductive wall by a vapor-permeable, liquid-tight membrane wall; and wherein the absorber comprises a plurality of absorption units each having a coolant channel flowed through by a coolant and bounded at least in part by a heat-conductive, vapor-tight and liquid-tight wall and having at least one absorption channel which is adjacent to the heat-conductive wall, to which the concentrated, low-refrigerant working substance pair is supplied and which is acted on by refrigerant vapor from the vapor space (32) via a vapor-permeable, liquid-tight membrane wall provided at its side disposed opposite the heat-conductive wall, wherein a respective evaporation unit and a respective absorption unit are alternately provided in a consecutive arrangement of the plurality of evaporation units and absorption units for forming an integrated evaporator/absorber unit, wherein a respective pair of directly consecutive evaporation and absorption units or absorption units and evaporation units has mutually facing, vapor-permeable, liquid-tight membrane walls;

wherein the evaporation units arranged between two absorption units each have a refrigerant channel at at least two mutually opposite sides of the refrigerant agent channel, said refrigerant channel being separated from the refrigerant agent channel by a heat-conductive, vapor-tight and liquid-tight wall and being separated from the vapor space at its side disposed opposite the heat-conductive wall by a vapor-permeable, liquid-tight membrane wall; and wherein the absorption units arranged between two evaporation units each have an absorption channel at at least two mutually opposite sides of the coolant channel, said absorption channel being separated from the coolant channel by a heat-conductive, vapor-tight and liquid-tight wall and being acted on by vapor from the vapor space via a vapor-permeable, liquid-tight membrane wall provided at its side disposed opposite the heat-conductive wall.

2. The absorption refrigeration machine in accordance with claim 1, wherein the pressure in the vapor space is lowered so far that vapor is produced by cooling the refrigerant agent at the heat-conductive, vapor-tight and liquid-tight wall in the refrigerant channel of a respective evaporation unit and this vapor enters through the vapor-permeable, liquid-tight membrane wall into the vapor space via which the absorption channel of a respective absorption unit has vapor applied to it.

3. The absorption refrigeration machine in accordance with claim 1, wherein the evaporator and the absorber are accommodated in a common housing comprising the vapor space.

4. The absorption refrigeration machine in accordance with claim 1, further comprising a desorber for the desorption of the refrigerant from a high-refrigerant working substance pair and a condenser for the condensation of the refrigerant with subsequent expansion.

5. The absorption refrigeration machine in accordance with claim 4, wherein the desorber comprises at least one desorption unit having a heating agent channel flowed through by a heating agent and bounded at least in part by a heat-conductive, vapor-tight and liquid-tight wall and having at least one desorption channel which is adjacent to the heat-conductive wall, which is acted on by the high-refrigerant working substance pair and which is separated from a further vapor space at its side disposed opposite the heat-conductive wall by a vapor-permeable, liquid-tight membrane wall; and wherein the condenser comprises at least one condensation unit having a coolant channel flowed through by a coolant and bounded at least in part by a heat-conductive, vapor-tight and liquid-tight wall and having at least one condensation channel which is adjacent to the heat-conductive wall and which is acted on by vapor from the further vapor space via a vapor-permeable, liquid-tight membrane wall provided at its side disposed opposite the heat-conductive wall.

6. The absorption refrigeration machine in accordance with claim 5, wherein the desorber comprises a plurality of desorption units.

7. The absorption refrigeration machine in accordance with claim 5, wherein the condenser comprises a plurality of condensation units.

8. The absorption refrigeration machine in accordance with claim 5, wherein a respective vacuum is present both in the first vapor space and in the further vapor space.

9. The absorption refrigeration machine in accordance with claim 8, wherein the pressure in the further vapor space is higher than in the first vapor space.

10. The absorption refrigeration machine in accordance with claim 4, wherein a common coolant circuit is provided for the absorber and for the condenser.

11. The absorption refrigeration machine in accordance with claim 1, further comprising at least one desorption unit respectively having a desorption channel at at least two mutually opposite sides of the heating agent channel, said desorption channel being separated from the heating agent channel by a heat-conductive, vapor-tight and liquid-tight wall and being separated from the further vapor space at its side disposed opposite the heat-conductive wall by a vapor-permeable, liquid-tight membrane wall.

12. The absorption refrigeration machine in accordance with claim 1, further comprising at least one condensation unit having a respective condensation channel at at least two mutually opposite sides of the coolant channel, said respective condensation channel being separated from the coolant channel by a heat-conductive, vapor-tight and liquid-tight wall and being acted on by vapor from the further vapor space via a vapor-permeable, liquid-tight membrane wall provided at its side opposite the heat-conductive wall.

13. The absorption refrigeration machine in accordance with claim 5, wherein the evaporator and the absorber, on the one hand, and the desorber and the condenser, on the other hand, are accommodated in two separate housings comprising the first and the further vapor spaces respectively.

14. The absorption refrigeration machine in accordance with claim 1, wherein a respective desorption unit and a respective condensation unit are alternately provided in a consecutive arrangement of a plurality of desorption units and condensation units for forming an integrated desorber/condenser unit.

15. The absorption refrigeration machine in accordance with claim 14, wherein a respective pair of directly consecutive desorption and condensation units or condensation and desorption units have mutually facing vapor-permeable, liquid-tight membrane walls.

16. The absorption refrigeration machine in accordance with claim 1, wherein the different channels, including the heat-conductive, vapor-tight and liquid-tight walls or the vapor-permeable, liquid-tight membrane walls bounding them are composed of plastic.

* * * * *